United States Patent [19]

Bieg

[11] Patent Number: 4,976,043
[45] Date of Patent: Dec. 11, 1990

[54] PRECISION CONTOUR GAGE

[75] Inventor: Lothar F. Bieg, Louisville, Colo.

[73] Assignee: The United States of America as represented by the United States Department of Energy, Washington, D.C.

[21] Appl. No.: 308,336

[22] Filed: Feb. 9, 1989

[51] Int. Cl.$^5$ ............................................. G01B 5/20
[52] U.S. Cl. ........................................ 33/551; 33/555; 33/553; 33/545; 33/572
[58] Field of Search .................. 33/556, 555, 554, 553, 33/551, 549, 545, 546, 503, 572

[56] References Cited

U.S. PATENT DOCUMENTS

| | | | |
|---|---|---|---|
| 3,279,079 | 10/1966 | Schiler | 33/556 |
| 3,911,257 | 10/1975 | Whitehouse et al. | 235/151.3 |
| 4,209,206 | 6/1980 | McMurtry et al. | 33/DIG. 2 |
| 4,265,022 | 5/1981 | Noguchi et al. | 33/553 |
| 4,324,049 | 4/1982 | Blose | 33/551 |
| 4,377,911 | 3/1983 | Iida et al. | 33/556 |
| 4,679,331 | 7/1987 | Koontz | 33/551 |

FOREIGN PATENT DOCUMENTS

2078399 6/1981 United Kingdom ................. 33/556

Primary Examiner—Allan N. Shoap
Assistant Examiner—William C. Dowling
Attorney, Agent, or Firm—Anne D. Daniel; James H. Chafin; William R. Moser

[57] ABSTRACT

An apparatus for gaging the contour of a machined part includes a rotary slide assembly, a kinematic mount to move the apparatus into and out of position for measuring the part while the part is still on the machining apparatus, a linear probe assembly with a suspension arm and a probe assembly including as probe tip for providing a measure of linear displacement of the tip on the surface of the part, a means for changing relative positions between the part and the probe tip, and a means for recording data points representing linear positions of the probe tip at prescribed rotation intervals in the position changes between the part and the probe tip.

11 Claims, 4 Drawing Sheets

PRECISION CONTOUR GAGE

The United States Government has rights in this invention pursuant to Contract No. DE-AC04-76DP03533 between the United States Department of Energy and Rockwell International Corporation.

BACKGROUND OF THE INVENTION

The present invention relates to the field of contour gages, and more particularly to a gage that accurately and automatically measures internal and external dimensions of hemispherical parts, both convex and concave.

In the art of measuring curved surfaces, U.S. Pat. No. 3,911,257 of Whitehouse et al is known. This patent is directed to an instrument to measure surface finish on cylindrical parts. The measurement is exclusively two dimensional. Only a very small slice of the overall shape and dimension of a part is carried out with each measurement. However, it would be desirable to be able to measure three-dimensional surfaces.

In accordance with the Whitehouse et al patent, only outside diameters or outside contours can be measured. The measurement plane is related to the location of the stylus, and the measurement is represented as a signal which relates to the variation in out-of-roundness of the workpiece being measured and the roughness of the surface of the workpiece. However, it would be desirable to be able to measure contours of interior surfaces as well as outside contours.

The measurement system described in the Whitehouse et al patent is not suitable for use on a machine tool whereby a machined part is measured while it is still in the machine tool fixture. To use the Whitehouse et al system, each machined part must be removed from the production equipment and then measured with the system. It would be desirable, however, to have a contour gage that could be used to measure a machined part while it is still associated with the machining equipment that produced the part.

For the Whitehouse et al device to carry out its measurements, the device needs to perform one complete revolution to permit an eccentricity term to be computed. The computation of the eccentricity term is derived from the signals provided by a sensor applied to the part being measured. Radius suppression and signal magnifications are necessary to actually display a measured shape of an outside contour of a part.

Furthermore, with the patent of Whitehouse et al, the disclosed device cannot measure the height of a part or the pole height radius of a hemispherical part. With certain types of parts, only the eccentricity of a part at a given distance around the equator of the part could be measured. It would be desirable, therefore, to have a contour gage that could carry out more complete measurements with machined parts.

In general, the prior art is very limited in its disclosure of on-machine gages that permit contour measurements of machined parts while they are still on the machining equipment. Industry generally separates the task of production from the task of inspection, such that these tasks are performed by two different departments in two different environments.

Among the limited prior art gaging devices that are used to measure the surfaces of machined parts while still on the machine tool, some gaging devices employ touch probes that are used in place of the cutting tool. Such touch probes use the slides of the machine tool and are limited to a point-to-point contact probing mode of operation. Consequently, such touch probe gages cannot perform any scanning action on the machined contour. It would be desirable, however, if a contour gage were available that did not use the slides of the machine tool and that performed a scanning action on the machined contour.

Other prior art gaging devices are known as array gages. With array gages, multiple individual LVDT probes are used to collect data relative to the machine tool. These array gages are dedicated to one type of part and are not flexible for use with a variety of part types. Furthermore, with array gages, a spiral probing pass is not possible since the spacing between LVDT probes determines the area to be inspected. Only a number of diameters away from the equator of the part are evaluated giving very little detail about the overall contour of the part being measured.

In the prior art, rotary encoders are either mounted right on an axis of a turning spindle, or the encoder is directly coupled to the shaft of a motor which controls a gage. In a rotary encoder mounted directly on a spindle, when the spindle undergoes one revolution, the encoder undergoes one revolution. This arrangement prevents accurate revolution of rotary motion of the spindle. More specifically, in 360 rotary degrees there are 21,600 rotary minutes (360×60) and 1,296,000 rotary arc seconds (21,600×60). If it is desired for a rotary encoder to have a resolution of 1 arc second, then the encoder would have to provide 1,296,000 individual increments for a 360 degree revolution. Such a fine resolution is not available in present encoders. It would be desirable, however, to obtain a rotary encoder that is capable of providing a resolution of 1 arc second of rotation.

In an encoder which is coupled to the shaft of a motor, the encoder will not detect any slippage that may result between the drive pulley on the motor and a rotary spindle. It would be desirable to have an encoder which would not be susceptible to error resulting from slippage between a drive motor and a rotary spindle.

There are known gages which utilize two linear Cartesian motions (e.g. an X and a Y) to gage circular surfaces with a probe. With such a Cartesian driven probe, the angle between the probe and the surface being gaged is constantly changing and is other than normal to the surface, except when the angle between the X and Y motions is 45 degrees. With the Cartesian driven probe, there may be heavy side loads exerted on the probe by the surface that is being gaged. Side loads being exerted on the probe can be the cause of erroneous data with respect to the gaged surface. It would be desirable to have a probe system which constantly maintains the probe substantially normal or perpendicular to the surface being gaged thereby avoiding side loads being exerted on the probe.

Accordingly, it is a primary object of the present invention to provide a precision gage that provides for contour measurements of three-dimensional surfaces.

Another object of the invention is to provide a precision gage that measure the contours of interior surfaces as well as the contours of exterior surfaces, especially of hemispherical parts.

Another object is to provide a contour gage that can be used to measure the contour of a part while it is still associated with the machining equipment that produced the part.

An additional object of the invention is to provide a precision contour gage that does not use the slides of a machine tool and that performs a scanning action on the machined contour.

A further object of the invention is to provide a rotary encoder that is capable of providing a resolution of 1 arc second of rotation.

Yet another object is to provide an encoder which is not susceptible to error resulting from slippage between a drive motor and a rotary spindle.

Still another object of the invention is to provide a probe system which constantly maintains the probe substantially normal to the surface being gaged thereby avoiding side loads being exerted by the surface onto the probe.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as described herein, a novel apparatus for measuring the contour of a machined part is provided. The apparatus comprises a rotary slide assembly for providing a rotation component to a data point on the surface of the part, means for supporting the rotary slide assembly including a kinematic mount with a fixed portion and at least one movable mounting portion to move the apparatus into and out of position for measuring the part by sliding the apparatus on the movable portion and by rotating the apparatus around the fixed portion, a linear probe assembly with a suspension arm supported by the rotary slide assembly and a tip assembly with a probe tip to contact the part and provide a linear component to a data point on the surface of the part, means for changing relative positions between the part and the probe tip, and means for recording data points representing linear positions of the probe tip at prescribed rotation intervals in the position change between the part and the probe tip.

In one embodiment, the means for recording the data may be a digital encoder, which is capable of digitizing.

A digital encoder is provided which is capable of digitizing the degree of rotation of the rotary slide assembly. One increment of the digital encoder is calibrated to correspond to a predetermined degree of rotation of the rotary slide assembly. More specifically, the digital encoder is calibrated so that one increment of the digital encoder corresponds to one arc second of rotation of the rotary slide assembly.

In one embodiment of the invention, the digital encoder includes means for adjustably supporting a variable diameter barrel that contacts a portion of the rotary slide assembly. Calibration of the digital encoder with respect to rotation of the rotary slide assembly is brought about by adjusting the diameter of the barrel that contacts the rotary slide assembly.

In another embodiment of the invention, the rotary slide assembly includes a variable diameter rotating portion, and the digital encoder includes means for adjustably supporting a barrel that contacts the variable diameter rotating portion. With this embodiment, calibration of digital encoding with respect to rotation of the rotary slide assembly is brought about by adjusting the barrel with respect to the variable diameter rotating portion.

Several alternate techniques of measuring the surface contours may be employed. In one technique, data representing linear positions of the probe tip are recorded when the part is stationary and after the position of the probe tip is changed with respect to the stationary part. In another technique, data representing linear positions of the probe tip are recorded after the part is rotated and when the probe tip is stationary. In yet another technique, data representing linear positions of the probe tip are recorded after the part is rotated and after the position of the probe tip is changed following the change in position of the part.

In accordance with another aspect of the invention, a method is provided for measuring the contour of a machined part on a machining apparatus, comprising the steps of: retaining the machined part on the machining apparatus; positioning a contour gage apparatus whereby the gage apparatus contacts the part and measures the contour; and moving the gage apparatus out of contact with the part.

The methods of the invention also provide a method for real-time adjusting of a machining apparatus. The real-time method comprises the steps of: (a) obtaining ideal contour data representing an ideal machined part; (b) performing an initial machining operation on the actual part; (c) retaining the part on the machining apparatus; (d) positioning a contour gage apparatus whereby the gage apparatus contacts the part and measures the contour to obtain actual contour data; (e) removing the contour gage apparatus from contact with the part; (f) comparing the actual contour data with ideal contour data and determining an actual disparity between the actual part and the ideal part; (g) adjusting the machining apparatus in real-time if the actual disparity is greater than a predetermined disparity between the actual part and the ideal part; and, h) performing an additional machining operation on the part to reduce the disparity between the actual part and the ideal part. The above-described steps b. through h. may be repeated as many times as required to obtain a disparity that is equal to or less than the predetermined disparity. The real-time adjusting of the machining apparatus may be in response to wear of a machining tool that occurs during machining.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
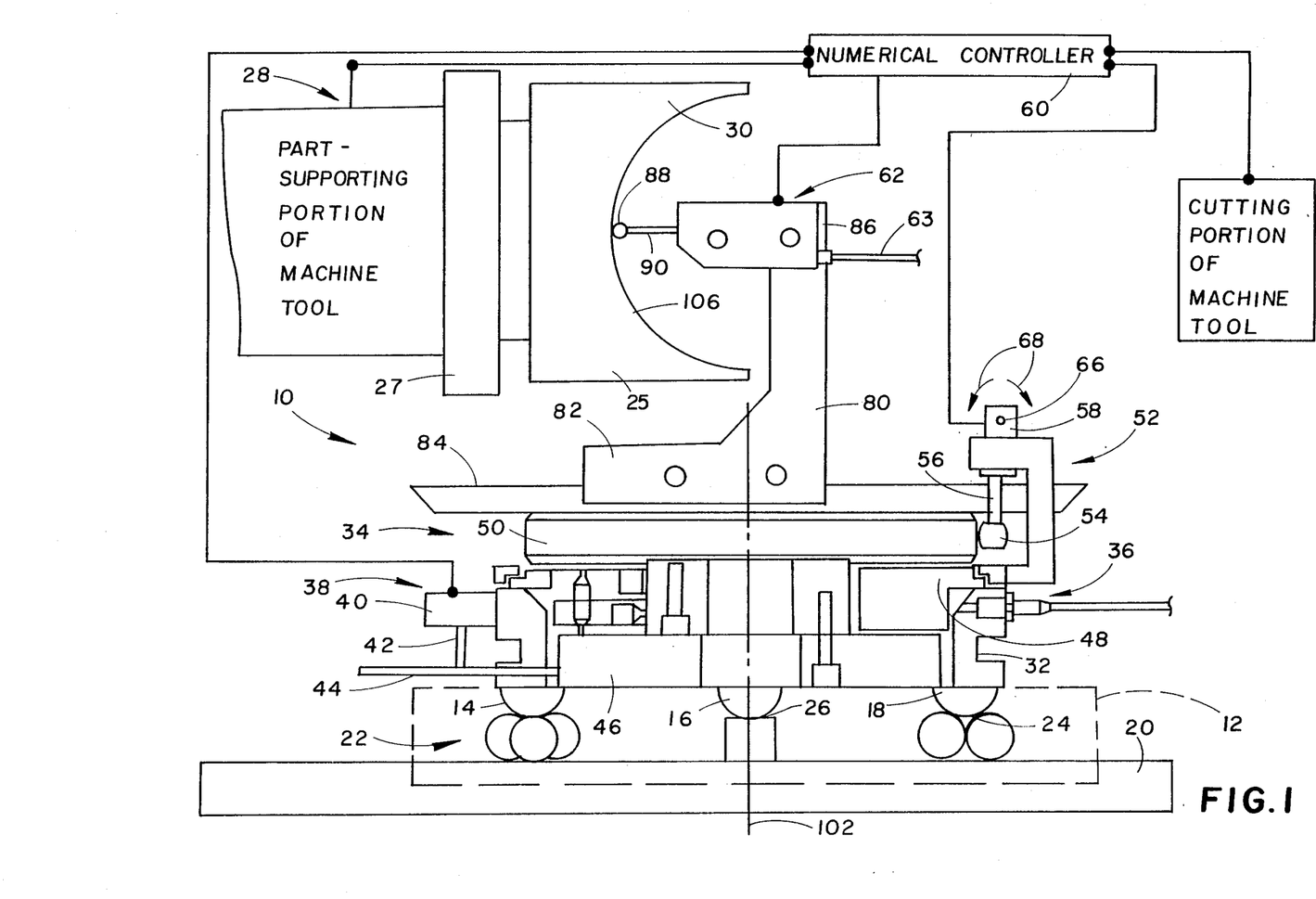
FIG. 1 is a side schematic view of an embodiment of a contour gage of the invention used for measuring a concave part in position on a machining apparatus; in this embodiment, a rotating platform has a constant diameter.

As shown in FIG. 1, an on-machine contour gage apparatus 10 of the invention is mounted on a kinematic mount 12 which includes three legs for support. The bottom of each leg has a ball 14, 16, and 18 on which the respective leg rolls whereby the on-machine contour gage apparatus of the invention is positioned on a slide 20. Ball 14 rests in a cone 22, which serves as an infinite fixed point (or radius point) around which the on-machine contour gage apparatus of the invention can be rotated for positioning. The second ball 18 rests in a groove 24 which allows the on-machine contour gage apparatus of the invention to expand if there would be thermal expansion in one direction along the central line of the groove 24. The third ball 16 rests on a flat surface 26 whereby the ball 16 can move in two directions. The kinematic mount 12 allows the on-machine contour gage apparatus of the invention to be positioned very accurately should it need to be removed from the slide and repositioned later. The kinematic mount 12 also permits the gage apparatus to be swung into or out of position with respect to the machining apparatus 28 which holds a part 30 whose contour is measured. The part 30 is mounted on vacuum pot chuck 25 on spindle 27 which forms part of the machining apparatus 28.

The on-machine contour gage apparatus of the invention includes a circular housing 32, a rotary slide assembly 34, and a hydrostatic bearing assembly 36 supported by the circular housing 32 and supporting the rotary slide assembly 34. A drive assembly 38 is supported by the circular housing 32 and includes a drive motor 40, a driven shaft 42, and a drive pulley 44 supported by the driven shaft 42. The drive pulley 44 is a metal disk which includes a hard rubber 0-ring (not shown) around the circumference of the disk and frictionally engages and drives the lower portion 46 of the rotary slide assembly 34.

The hydrostatic bearing assembly 36 includes a circular ring 48 (supported by the housing 32) upon which the top portion of the rotary slide assembly is positioned. When air is pumped through a plurality of holes (not shown) in the top, bottom, and side surfaces of the circular ring 48, the air serves to lift up the top portion 50 of the rotary slide assembly 34 (perhaps only 20 millionth of an inch), permitting the entire rotary slide assembly 34 to be supported by a film of air (air bearing).

The surfaces of the on-machine contour gage apparatus of the invention are highly polished surfaces, and the hydrostatic bearing prevents small particles from scratching the surfaces during rotation of the contouring gage.

An encoder assembly 52 is in contact with the top portion 50 of the rotary slide assembly 34 and produces digital signals that represent the rotational movement of the rotary slide assembly 34. More specifically, the encoder assembly 52 includes a special barrel-shaped pulley 54 which rotates as the top portion 50 of the rotary slide assembly 34 rotates. The pulley 54 has an element which frictionally engages the perimeter of the top portion 50 of the rotary slide assembly 34. The pulley 54 is located on an encoding shaft 56 which, in turn, is connected to an encoding device 58 which converts the rotary motion of the pulley 54 into digital information.

The digital data representing the rotation of the rotary slide assembly 34 is sent to an electronic apparatus, a numerical controller 60, which may be a General Electric Model No. 2000NC machine tool control. The numerical controller 60 has all of the numerical data necessary to guide the machining apparatus around its tooling path to machine a part 30. In addition, the electronic apparatus receives the digital data from the encoder assembly 52 once the part is machined.

More specifically, the numerical controller 60 performs the following three functions. It takes digital data representing the angular position of the contour gage apparatus of the invention through the encoder assembly 52 and its electronics. It controls the drive motor 40, based on the data fed back from the encoder 58, to position the contour gage apparatus of the invention, and, therefore, to drive the gage in an angular or circular motion. It collects data from a linear probing system 62 which interfaces with the machined surface of the part 30 and compares the circular motion of the contour gage apparatus of the invention with the ideal shape of the machined part and computes any disparity between the two sets of data.

In accordance with a preferred embodiment of the invention, the invention, the radius of the upper portion 50 of the rotary slide assembly 34 and the radius of the special pulley 54 and are chosen to be in a preferred ratio such that when the rotary slide assembly 34 undergoes one complete revolution (360 degrees or 1,296,000 arc seconds), the special pulley 54 causes the encoder device 58 to increment through 1,296,000 counts. Whereby, each count in the encoder device 58 represents 1 arc second of rotary motion of the rotary slide assembly 34. In the preferred embodiment, the preferred ratio of radius of the upper portion 50 of the rotary assembly 34 to the radius of the special pulley 54 is a ratio of 12.96 to 1. By adjusting the ratio of the radius of the upper portion 50 of the rotary slide assembly 34 to the radius of the special pulley 54 to be exactly 12.96 to 1, one count in the encoder device 58 corresponds to 1 arc second of rotation of the rotary slide assembly 34.

As shown in FIG. 1, the special pulley 54 has a variable radius contour. The effective radius of the special pulley 54 that contacts the upper portion 50 of the rotary slide assembly 34 can be adjusted by tilting the encoder device 58 about axle 66 in either direction indicated by the arrows 68. By proper selection of the radius of the special pulley 54, the desired relationship of one encoder count corresponding to 1 arc second of rotation of the rotary assembly 34 can be obtained.

To aid in adjusting the radius of the special pulley 54 with respect to the fixed radius of the top portion 50 of rotary slide assembly 34, an autocollimator can be used. Prior to rotating the rotary slide assembly 34 through one complete revolution, one set of cross hairs on the autocollimator is superimposed on a second set of cross hairs. Then the rotary slide assembly 34 is rotated, and the two sets of cross hairs are no longer superimposed. When the rotary slide assembly 34 has completed one complete rotation of 360 degrees (1,296,000 arc seconds), the cross hairs are superimposed once again. The barrel radius of the special pulley 54 is adjusted so that the encoder indicates a count of 1,296,000 counts for one complete rotation (1,296,000 arc seconds) of the rotary slide assembly 34.

Figure 2:
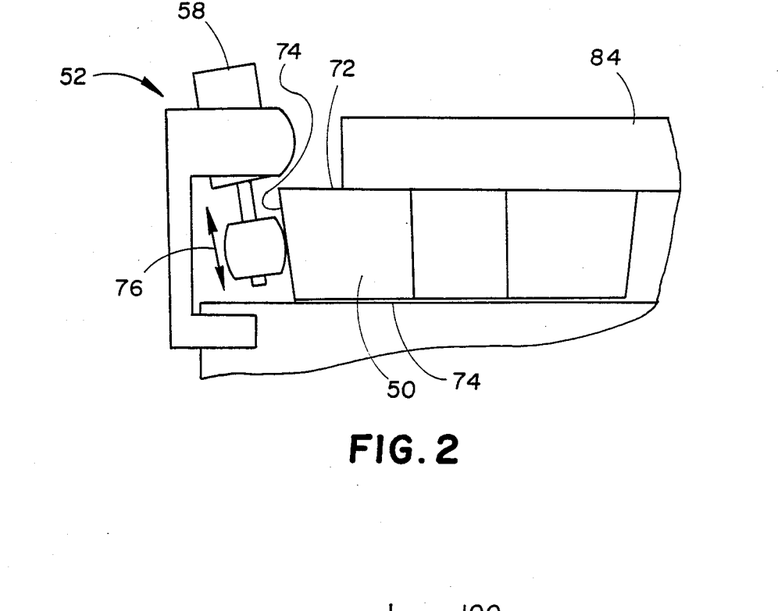
FIG. 2 depicts an alternative embodiment for a rotating platform which has a variable diameter.

Alternatively, as shown in FIG. 2, the outer wall 70 of upper portion 50 of the rotary slide assembly is ground into a sloping surface which is not perpendicular to the upper 72 and lower 74 surfaces of the upper portion 50. With this embodiment, the fine tuning of the resolution of the encoder device 58 can be adjusted by raising and lowering the encoder assembly as indicated by arrows 76 in a plane parallel to the sloping outer wall 70 rather than tilting the encoder assembly as depicted in FIG. 1.

In the preferred embodiment, for a special pulley 54 to operate with an upper portion 50 of the rotary slide assembly 34 of 8.00000 diameter so that the resolution of the encoder assembly is 1 count per 1 arc second of rotary slide assembly rotation, the diameter of the portion of the special pulley 54 that contacts the side of the upper portion 50 of the rotary slide assembly 34 is 0.617284 inches.

It is clear that if the diameter of the special pulley 54 were changed, then the resolution of the rotation of the rotary slide assembly 34 would also change. For example, if the radius of the special pulley decreased by a power of ten (10), then the resolution of the encoder assembly 52 could be increased by a power of ten (ten times).

Further in reference to FIG. 1, a suspension arm 80 is mounted on the upper portion 50 of the rotary assembly 34 and rotates therewith. The suspension arm 80 is preferably made of a material known as INVAR which has very low thermal expansion properties. More specifically, the suspension arm 80 is mounted on a conventional slide and rail assembly such as used in optical benches which is mounted on the upper portion 50 of the rotary assembly 34. The slide and rail assembly includes a slider portion 82 and a rail portion 84 mounted on the top portion 50 of the rotary slide assembly 34. The slide and rail assembly is provided so that the contour gage apparatus of the invention can accommodate a wide range of parts. A six inch radius would permit measurement of the outer contour and the inner contour of a 12" part. The slide and rail assembly has a ruling device thereon so the user can know the approximate position of the suspension arm 80 with respect to the center of the part 30 being gaged.

In FIG. 1, the linear probing assembly 62 is located at the upper end 86 of the suspension arm 80. The linear probing assembly 62 is activated by air flow brought to the probing system by an air hose 63. The activating air flow is controlled by the numerical controller 60. The tip 88 of the linear probe 90 is accelerated by the activating air toward the part 30 surface until it contacts the part surface and maintains contact with the part surface with a small probing force which is no more than 20 grams of force. The linear probing system 62 provides conversion of linear motion of the tip 88 into electrical signals. The electrical signals are sent to the numerical control apparatus 60. The linear probing assembly 62 includes a digital length slide incorporating a glass scale as a measuring standard. The graduation of the scale (grating) is photoelectrically scanned. The gaging pressure is pneumatically activated and adjustable within the range of 0.2 Newton to 1.1 Newton. Due to the fact that the probe 90 of the linear probing assembly is pneumatically activated, the airflow (psi) can be regulated, which results in a fine adjustment of the probing force over a large range, and the temperature of the supplied air can be controlled, which keeps the entire linear gaging slides at a constant temperature. The maximum possible airflow ensures a continuous flow of controlled air away from the linear gaging slide, keeping any foreign particles off the slide.

Figure 3:
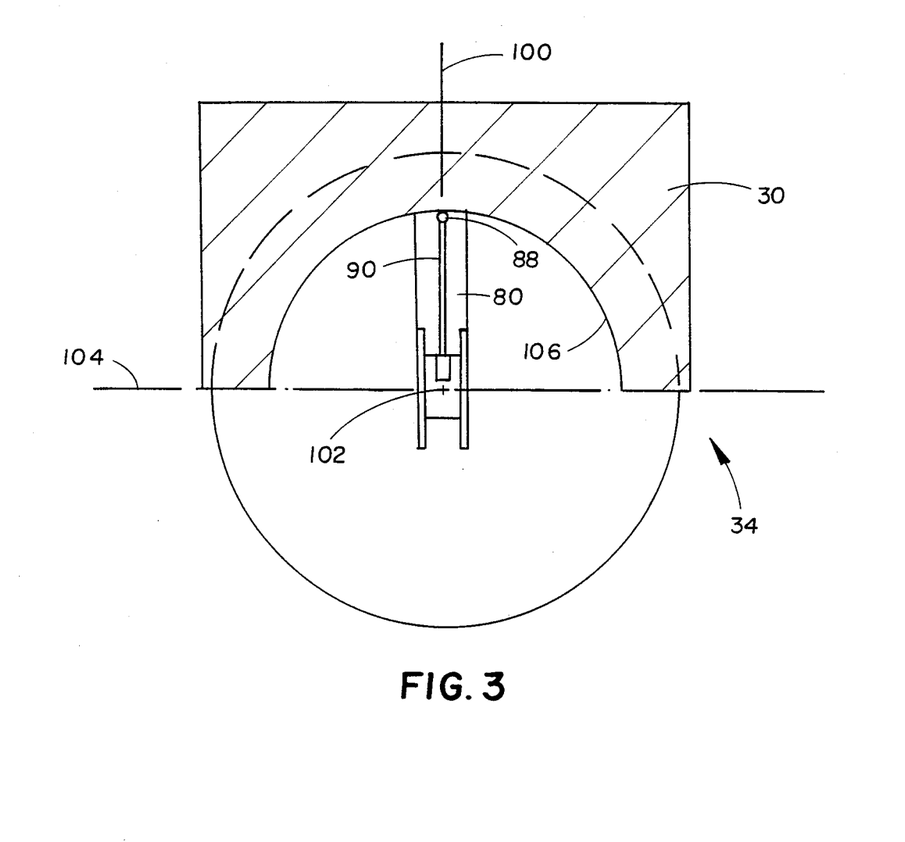
FIG. 3 is a top view of the embodiment shown in FIG. 1.

Now referring to FIG. 3, an imaginary polar axis 100 extends from the axis of rotation 102 (projecting normal to FIG. 3) of the rotary slide assembly 34 to the top of the part 30. Also, an imaginary equator 104 extends from left to right along the lower edges of the part 30 and through the axis 102 of the rotary slide assembly 34. In one mode of sweeping the part 30, the part 30 remains stationary, the rotary slide assembly 34 rotates, and the probe tip 88 sweeps from the left side of the equator 104 of the part 30. This mode of probe sweep is known as a meridian sweep. In practice, a plurality of meridian sweeps, each indexed one degree apart, could be obtained for a given part. Thus, to conduct a plurality of sweeps for a quadrant of a given part, each sweep spaced one degree apart from the preceding sweep, there would be a family of 90 sweeps for the quadrant. In FIG. 3, the linear probe 90 is constantly normal to the surface 106 of the concave part 30 as the part 30 is being probed. In this way, side loads are avoided on the tip 88 of the linear probe 90.

Other sweep patterns may be employed for a given part. More specifically, an azimuthal sweep pattern may be employed. In this sweep method, the linear probe tip is held stationary, and the part is rotated around the stationary tip. By rotating the part a full 360 degrees about the stationary probe tip, a complete circle pattern is sweeped across the part. Then, the probe tip is indexed, e.g. one degree, and another azimuthal sweep takes place. By indexing the probe tip one degree for each of 90 sweeps, the entire part is sweeped.

Still another sweep pattern may be employed. In a spiral sweep pattern, both the rotary slide and the part are rotated simultaneously in a predetermined rate of rotation. Preferably, the rates of rotation are controlled so that the pitch of the spiral sweep pattern traced by the probe tip is approximately 2 degrees.

Yet another sweep pattern may be employed in which both the part that is measured and the probe tip remain stationary for one point at a time on the part to be probed. Especially for an area of the part that seems to be particularly deviating from prescribed specification, the entire deviating area can be probed on a point by point pattern by indexing both the part and the probe tip incrementally between individual point measurements. This static probing pattern is particularly time consuming, but it may reveal much useful information about problems areas of a deviating part.

With reference to FIGS. 1 and 3, for measuring a concave part 30, the contour gage apparatus 10 operates as follows. The numerical controller 60 causes the rotary slide assembly 34 to rotate at a predetermined arc rate. At the same time, the probe tip 88 of the linear probing assembly 62 is urged against the interior circular surface of the concave part 30. As the rotary slide assembly 34 is rotated through 10 degrees of arc, for example, the encoder assembly 52 is sending out counts for arc seconds of rotary motion to the numerical controller 60. At the same time the tip 88 of the linear probe 90 slides against the concave surface 106 of the part 30. In sliding against the surface 106 of the concave part 30 any deviations from an ideal circular surface will be detected by linear motions of the tip 88. The numerical controller 60 records the coordinates of arc seconds of rotation of the rotary slide assembly 34 and lengths of linear motion of the probe tip 88. In this way, any deviations (aspherities) of the actual concave surface 106 from an ideal circular surface would be recorded. The less the tip 88 moves linearly, the more closely the curved surface 106 meets the ideal. Conversely, the greater the linear movement of the tip 88, the less the curved surface 106 approaches the ideal circular surface. The actual measurements of the curved surface of the part 30 are compared to the theoretical ideal measurements which are stored in numerical controller 60, whereby deviations of the actual part 30 from an ideal part are calculated. The acceptance or rejection of the part can depend upon the degree of deviation or disparity of the measurement of the actual part 30 from the ideal part.

Figure 4:
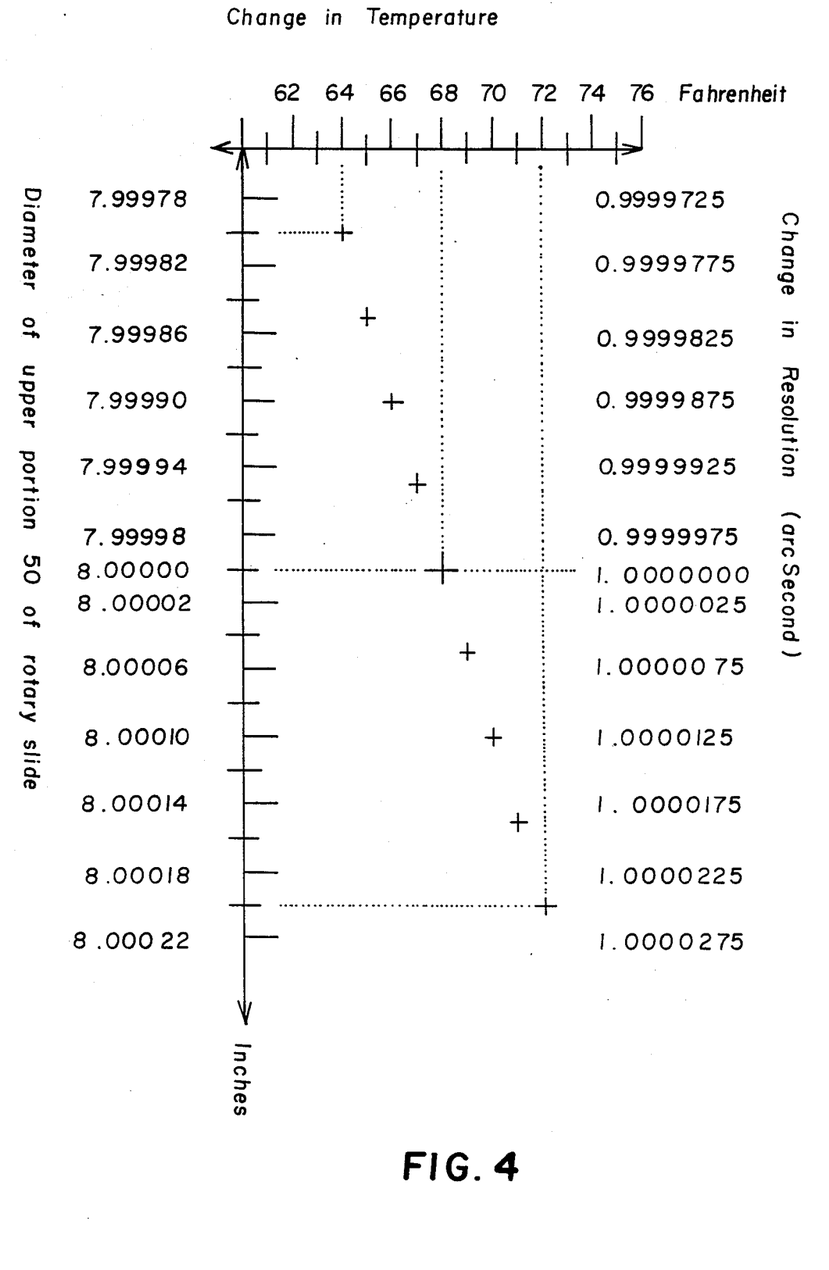
FIG. 4 is a graph showing the relationship between temperature and the diameter of a rotating platform used in the invention.

With reference to FIG. 4, a graph is presented which depicts the change in diameter of the upper portion 50 of the rotary slide assembly 34 in response to temperature changes in the environment. The nominal temperature is 68 degrees Fahrenheit. The nominal diameter of the upper portion 50 of the rotary slide assembly 34 is 8.00000 inches. The nominal resolution is 1.0000000 arc second per each count of the encoder assembly 52. It is seen that, from a low temperature of 64 deg. F. to a high temperature of 72 deg. F, the resolution changes only neglectably from 0.9999750 arc seconds resolution to 1.0000250 arc seconds resolution. This slight change in resolution occurs from a relatively insignificant change in diameter of the upper portion 50 of the rotary slide assembly 34 from 7.99900 inches to 8.00020 inches. The lack of sensitivity of the resolution of the contour gage apparatus of the invention to temperature enhances the utility of the gage in environments where coolants are used for the machining operations.

Figure 5:
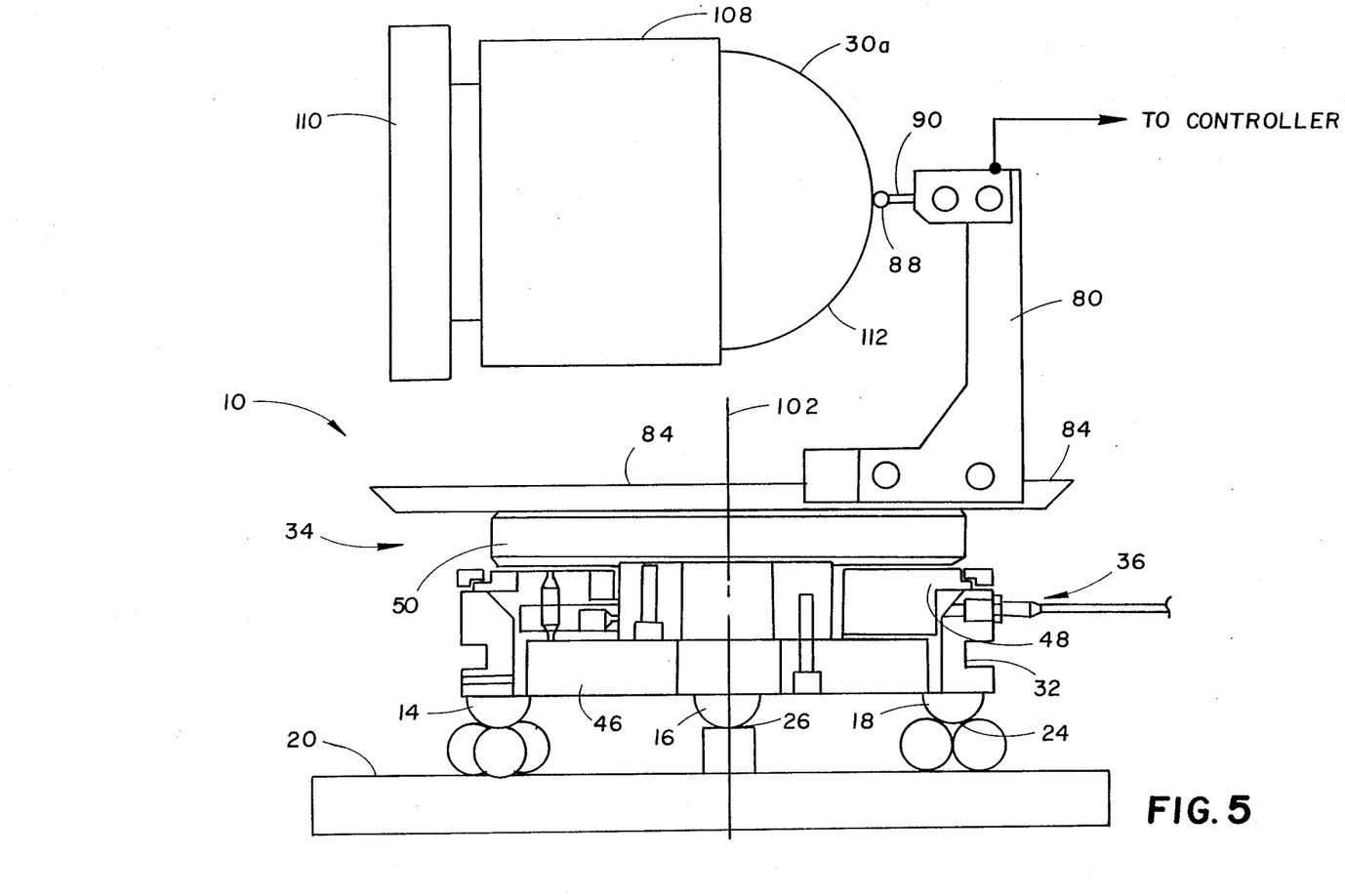
FIG. 5 is a partial side schematic view of the embodiment of FIG. 1 used for measuring a convex part.

Referring to FIG. 5, a convex part 30a is being swept by the probe tip 88 using a meridian sweep. More specifically, convex part 30a is held in position by a vacuum nose arbor 108 attached to a spindle face 110 of a machining apparatus. The suspension arm 80 and the probe tip 88 have been positioned on the rotary slide assembly 34 by moving the position of the suspension arm 80 along the rail 84. Then, by rotating the rotary slide assembly 34, the suspension arm 80 and the probe tip 88 revolve around the axis of rotation 102. As the probe tip 88 revolves in contact with the outer surface 112 of the convex part 30a, a meridian sweep of the surface 112 of the convex part 30a by the probe tip 88 takes place, and data representing the position of the probe tip 88 is recorded to be compared to stored data representing an ideal convex surface.

The ideal measurements for a given part, whether concave or convex, may be computed by employing a variety of mathematical curve fitting processes. More specifically, a mathematically calculated shape for a given part is calculated by employing a Wilson-Fowler curve fitting routine. The ideal shape of a part can be described by spherical radii, e.g. at 2 degree increments. Then, a mathematical curve fitting routine is employed to arrive at an ideal smooth curve that connects all of the incremental spherical radii.

Once the ideal curve is arrived at, the information describing the curve is digitized and fed to the numerical controller 60 of a numerically controlled machining apparatus, e.g. a cutting machine, which performs cuts to produce the desired machined part. The machining may be controlled by the numerical controller 60 to take place in two passes: first a rough cut; and then a final cut, e.g. for the last 1/16th inch, or a fraction thereof.

After the part is fabricated, the gage of the invention is activated by the numerical controller 60 to begin the measuring process. As provided by the invention, the apparatus for measuring the contour of the already-machined part is different from the apparatus that cuts the machined part so that any imperfections or hidden deficiencies in the machining process would not be duplicated in the measuring process.

A known phenomenon in the art of part machining is tool wear that occurs during the machining of a given part. For example, after a cutting tool is put in fresh at the beginning of the first cut in the machining of the part, during the machining operation, the tool undergoes wear continuously. By employing the on-machine contour gage of the invention, a deviation of the actual machined part from the ideal measurements stored in the numerical controller 60 can be indicative of cutting tool wear that occurs during machining. From this information, the numerical controller 60 can then calculate a new tool path which could correct for tool wear.

In summary, numerous benefits have been described which result from employing the principles of the invention. With the invention a precision gage is provided for measuring the contours of three-dimensional parts. The precision gage of the invention measures the contours of interior surfaces as well as the contours of exterior surfaces, especially of hemispherical parts. The contour gage of the invention can be used to measure a part that is undergoing machining operations while the part is still in the machining equipment. The contour gage of the invention can be interfaced to the controller for the machine tool to control the machine tool in response to the progress of the machining operation. The invention provides a precision contour gage that does not use the slides of a machine tool and that performs a scanning action on the machined contour. The drive motor is separated from the encoding system. Therefore any noise inherent to the motor is not transformed into the encoder. Any slippage between the drive pulley and rotary slide is detected by the encoder and compensated for until the motor positions the rotary slide at the location specified.

Furthermore, by employing the principles of the invention, a precision gage is provided that is capable of measuring the contours of different part sizes, especially different part sizes of the same part family.

The foregoing description of the invention has been presented for purpose of illustration and description. It is not intended to be exhaustive or to limit the invention to the precise form disclosed. Obvious modifications or variations are possible in light of the above teachings. For example, due to the environmental constraints in which the gage has to perform, it is desirable to keep the gage of the invention as compact as possible. An overly large or overly weighty contour gage of the invention could impede its close association with the machine tool.

In another modification, a process for cleaning the components of the contour gage could be fully automated to assure full independence from human operators. The contour gage should be kept clean and dry and free of machined chips to assure that accurate measurements take place.

The embodiments specifically disclosed were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for measuring the contour of a machined part, comprising:
    a rotary slide assembly for providing a rotation component to a data point on the surface of the part,
    means for supporting said rotary slide assembly, including a kinematic mount comprised of a fixed mounting portion and at least one movable mounting portion, whereby the apparatus is moved into and out of measuring position with respect to the part by sliding of the apparatus on said movable mounting portion and by rotation of the apparatus around said fixed mounting portion,
    a linear probe assembly comprised of a suspension arm and a tip assembly, said suspension arm supported by said rotary slide assembly, said tip assembly including a probe tip for contacting the part and providing a linear component to a data point on the surface of the part,
    means for changing relative positions between the part and said probe tip, and
    means for recording data points representing linear positions of said probe tip at prescribed rotation intervals in the change in positions between the part and said probe tip.

2. The apparatus described in claim 1 wherein said data recording means includes a digital encoder capable of digitizing the degree of rotation of said rotary slide assembly.

3. The apparatus described in claim 2 wherein one increment of said digital encoder is calibrated to correspond to a predetermined degree of rotation of said rotary slide assembly.

4. The apparatus described in claim 2 wherein one increment of said digital encoder is calibrated to correspond to one arc second of rotation of said rotary slide assembly.

5. The apparatus described in claim 2 wherein said digital encoder includes means for adjustably supporting a variable diameter pulley that contacts a portion of said rotary slide assembly, whereby calibration of digital encoding with respect to rotation of said rotary slide assembly is brought about by adjusting the diameter of said barrel that contacts said rotary slide assembly.

6. The apparatus described in claim 2 wherein:
    said rotary slide assembly includes a variable diameter rotating portion,
    said digital encoder includes means for adjustably supporting a pulley that contacts said variable diameter rotating portion, whereby calibration of digital encoding with respect to rotation of said rotary slide assembly is brought about by adjusting said barrel with respect to the variable diameter rotating position.

7. The apparatus described in claim 1 wherein said rotary slide assembly includes a rotating portion supported by an air bearing.

8. The apparatus described in claim 1 wherein:
    said suspension arm includes a slider portion,
    said rotary slide assembly includes a rail portion, said slider portion being capable of sliding upon said rail portion, whereby said linear probe assembly is capable of being positioned with respect to said rotary slide assembly.

9. An apparatus for measuring the contour of a machined part, comprising:
    a rotary slide assembly including driven member, a shaft member extending upward from said driven member, a rotating platform portion supported by said shaft member, and a rail portion supported by said rotating platform portion,
    means for supporting said rotary slide assembly including an air bearing assembly which directly supports said platform portion,
    a housing for supporting said support means,
    a kinematic mount supporting said support means, said kinematic mount comprised of a fixed mounting portion and at least one movable mounting portion, whereby the contour gage apparatus is moved into and out of measuring position with respect to the part by sliding of the apparatus on said movable mounting portion and by rotation of the gage apparatus around said fixed mounting portion,
    a linear probe assembly comprised of a suspension arm and a tip assembly including a probe tip for contacting the part, said suspension arm supported by said rotary slide assembly and including a slider portion which is capable of sliding upon said rail portion, whereby said linear probe assembly is capable of being positioned with respect to said rotary slide assembly,
    means for driving said driven member, whereby said rotary slide assembly is rotated and the relative positions between the part and said probe tip are changed,
    means for recording data representing linear positions of said probe tip at prescribed intervals in the change in positions between the part and said probe tip, said data recording means including a digital encoder capable of digitizing the degree of rotation of said rotary assembly, wherein one increment of said digital encoder is calibrated to correspond to one arc second of rotation of said rotary slide assembly, said digital encoder including means for adjustably supporting a variable diameter barrel that contacts a portion of said rotary slide assembly, whereby calibration of digital encoding with respect to rotation of said rotary slide assembly is brought about by adjusting the diameter of said barrel that contacts said rotary slide assembly.

10. An apparatus for measuring the contour of a machined part, comprising:
    a rotary slide assembly including driven member, a shaft member extending upward from said driven member, a rotating platform portion supported by said shaft member, and a rail portion supported by said rotating platform portion,
    means for supporting said rotary slide assembly including an air bearing assembly which directly supports said platform portion,
    a housing for supporting said support means, a kinematic mount supporting said support means, said kinematic mount comprised of a fixed mounting portion and at least one movable mounting portion, whereby the contour gage apparatus is moved into and out of measuring position with respect to the part by sliding of the apparatus on said movable mounting portion and by rotation of the gage apparatus around said fixed mounting portion a linear probe assembly comprised of a suspension arm and a tip assembly including a probe tip for contacting the part, said suspension arm supported by said rotary slide assembly and including a slider portion which is capable of sliding upon said rail portion, whereby said linear probe assembly is capable of being positioned with respect to said rotary slide assembly, wherein said rotary slide assembly includes a variable diameter rotating portion, means for driving said driven member, whereby said rotary slide assembly is rotated and the relative positions between the part and said probe tip are changed, means for recording data representing linear positions of said probe tip at prescribed intervals in the change in positions between the part and said probe tip, said data recording means including a digital encoder capable of digitizing the degree of rotation of said rotary assembly, wherein one increment of said digital encoder is calibrated to correspond to one arc second of rotation of said rotary slide assembly, said digital encoder including means for adjustably supporting a barrel that contacts a said variable diameter rotating portion of said rotary slide assembly, whereby calibration of digital encoding with respect to rotation of said rotary slide assembly is brought about by adjusting said barrel with respect to said variable diameter rotating position.

11. The apparatus of claim 1, wherein said kinematic mount further comprises a first, a second and a third leg, each leg having a top portion and a bottom portion, said bottom portion of each said leg comprising a ball, and
wherein said ball of said first leg rests in a cone, whereby said ball of said first leg is fixed in place allowing for rotation of said apparatus around said cone,
wherein said bal of said second leg rests in a groove, whereby said apparatus can expand along a central line of said groove, and
wherein said ball of said third leg rests on a flat surface, whereby said third ball can move in two directions.

* * * * *